(12) United States Patent
Bendahan

(10) Patent No.: US 12,332,191 B2
(45) Date of Patent: Jun. 17, 2025

(54) SYSTEMS AND METHODS FOR REAL-TIME CONFIGURABLE BACKSCATTER SCANNERS

(71) Applicants: Joseph Bendahan, San Jose, CA (US); Smiths Detection Inc., Edgewood, MD (US)

(72) Inventor: Joseph Bendahan, San Jose, CA (US)

(73) Assignee: Smiths Detection Inc., Edgewood, MD (US)

( * ) Notice: Subject to any disclaimer, the term of this patent is extended or adjusted under 35 U.S.C. 154(b) by 218 days.

(21) Appl. No.: 18/011,617

(22) PCT Filed: Jun. 24, 2021

(86) PCT No.: PCT/US2021/038911
§ 371 (c)(1),
(2) Date: Dec. 20, 2022

(87) PCT Pub. No.: WO2021/262987
PCT Pub. Date: Dec. 30, 2021

(65) Prior Publication Data
US 2023/0236141 A1    Jul. 27, 2023

Related U.S. Application Data

(60) Provisional application No. 63/043,941, filed on Jun. 25, 2020.

(51) Int. Cl.
*G01N 23/203*  (2006.01)
*G01N 23/20008*  (2018.01)
*G01V 5/222*  (2024.01)

(52) U.S. Cl.
CPC ..... *G01N 23/203* (2013.01); *G01N 23/20008* (2013.01); *G01N 2223/053* (2013.01); *G01V 5/222* (2024.01)

(58) Field of Classification Search
CPC ....... G01N 2223/053; G01N 2223/204; G01N 2223/639; G01N 23/203; G01N 23/20008; G01V 5/222; G01V 5/00
See application file for complete search history.

(56) References Cited

U.S. PATENT DOCUMENTS 2,792,502 A * 5/1957 O'Connor ............ G01N 23/043
378/58
6,421,420 B1 7/2002 Grodzins
(Continued)

FOREIGN PATENT DOCUMENTS

| EP | 2629119 A2 | 8/2013 | |
|---|---|---|---|
| WO | WO-2010097621 A2 * | 9/2010 | ............. A61B 6/032 |
| WO | 2010135620 A2 | 11/2010 | |

OTHER PUBLICATIONS

WO-2010097621-A2 (Year: 2010).*
(Continued)

*Primary Examiner* — Dani Fox
*Assistant Examiner* — Miya Downing
(74) *Attorney, Agent, or Firm* — Armstrong Teasdale LLP

(57) ABSTRACT

Described herein are systems and methods for backscatter imaging. A backscatter imaging system configurable in real-time for imaging an object is provided. The backscatter imaging system includes a source array including a plurality of discrete sources, and a collimator array including a plurality of collimators corresponding to the plurality of discrete sources. The source array is configured to selectively activate the plurality of discrete sources at a frequency that is determined based at least in part on a speed of the object relative to the backscatter imaging system.

17 Claims, 8 Drawing Sheets

(56) References Cited

U.S. PATENT DOCUMENTS

| | | |
|---|---|---|
| 7,095,823 B2 | 8/2006 | Topolnjak |
| 7,400,701 B1 | 7/2008 | Cason |
| 7,505,562 B2 | 3/2009 | Dinca |
| 8,300,763 B2 | 10/2012 | Shedlock |
| 9,366,759 B2 * | 6/2016 | Kang .................... G01S 17/894 |
| 2002/0097836 A1 | 7/2002 | Grodzins |
| 2006/0256917 A1 * | 11/2006 | Jacobs ................. G01N 23/203 |
| | | 378/87 |
| 2016/0003967 A1 | 1/2016 | Chen et al. |
| 2018/0252841 A1 | 9/2018 | Grodzins et al. |

OTHER PUBLICATIONS

International Search Report and Written Opinion issued in International Patent Application No. PCT/US2021/038911, mailed Oct. 15, 2021, 16 pages.
Extended European Search Report for EP Patent Application No. 21830243.8 dated Jul. 5, 2024; 4 pp.

* cited by examiner

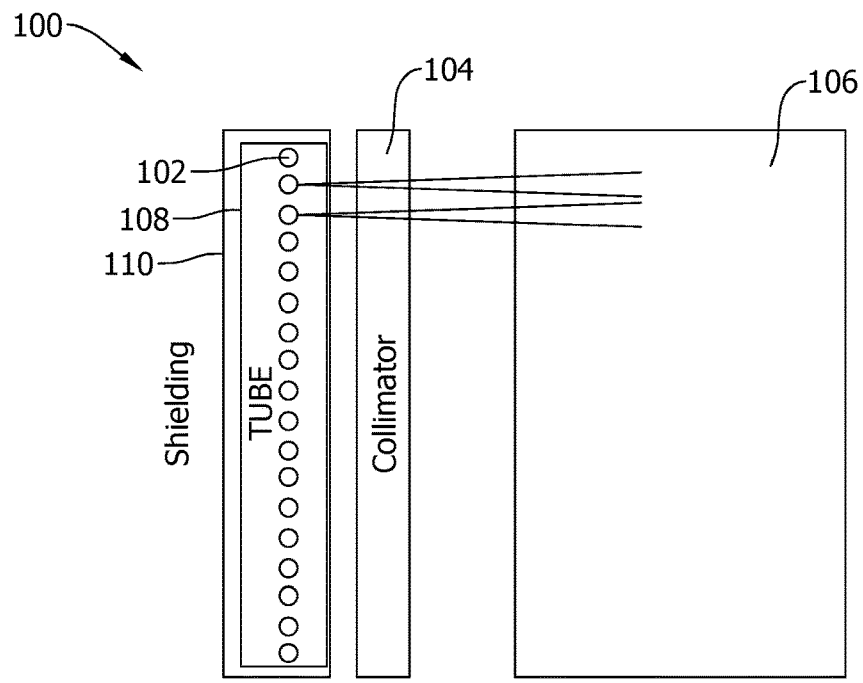
FIG. 1
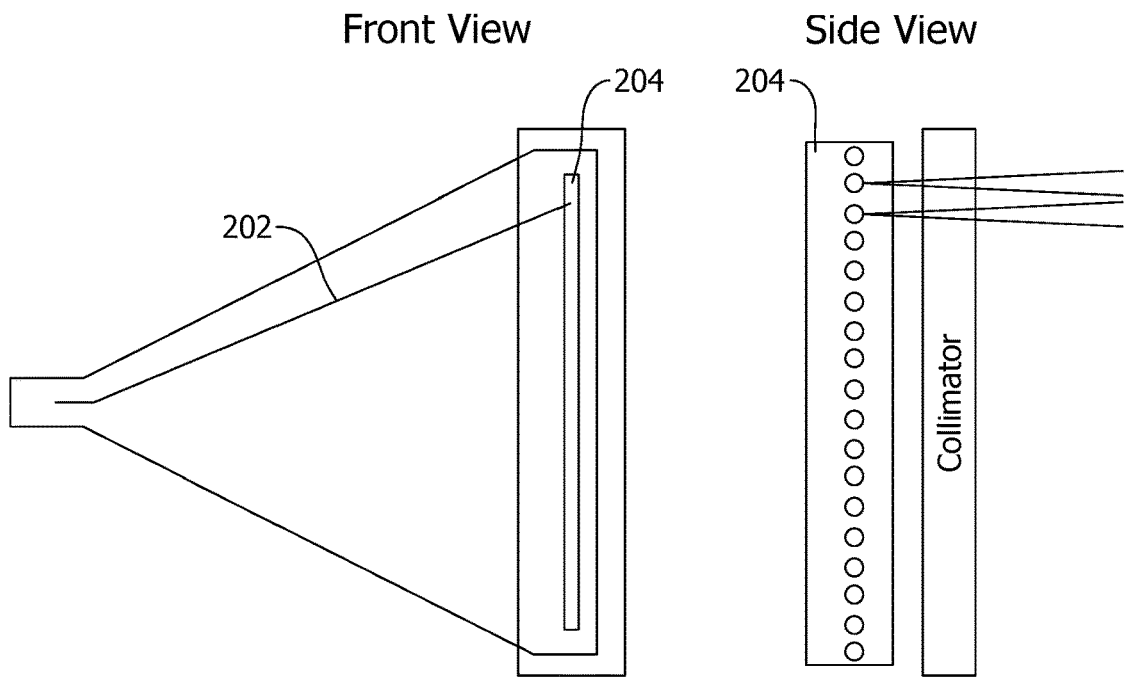
FIG. 2A
FIG. 2B

Nominal Speed 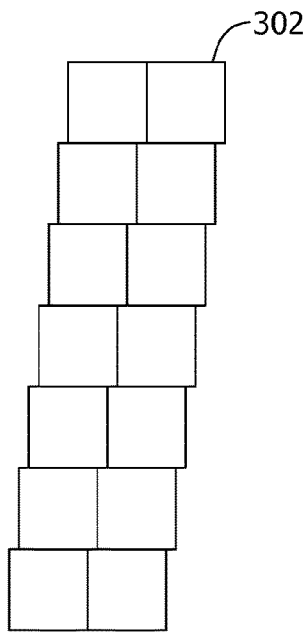
Low Speed 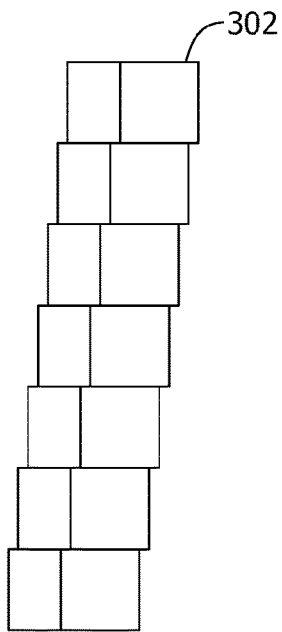
High Speed 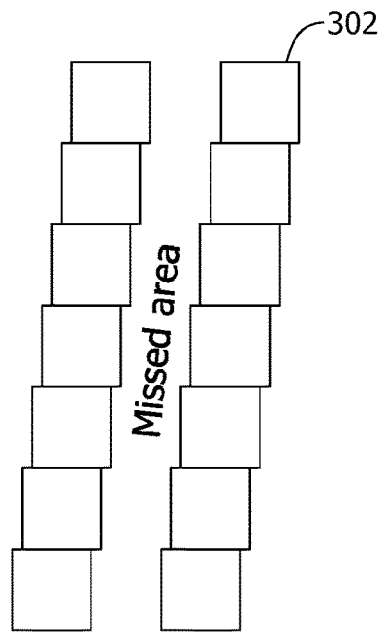
Prior art
FIG. 3A
Prior art
FIG. 3B
Prior art
FIG. 3C
Nominal Speed 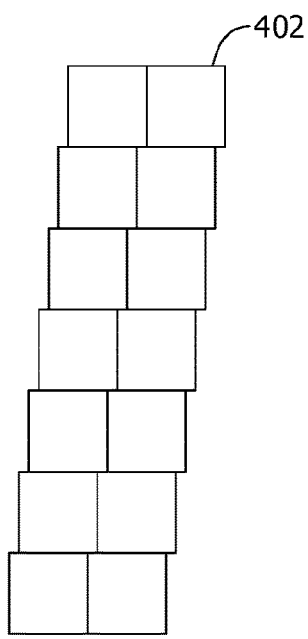
Low Speed 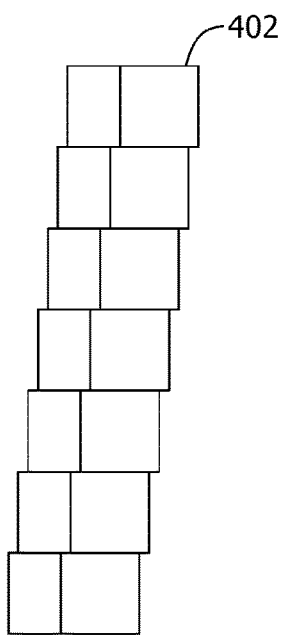
High Speed 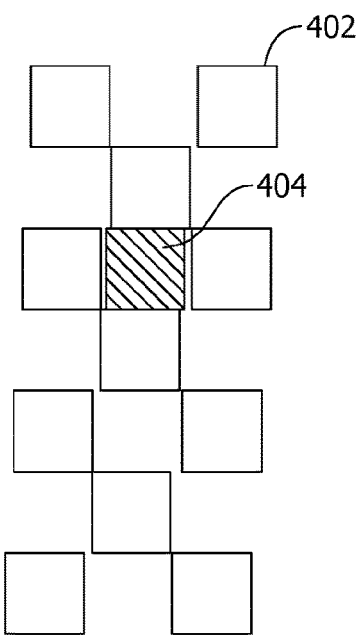
 Average of four neighbors
FIG. 4A
FIG. 4B
FIG. 4C Low Resolution High Resolution

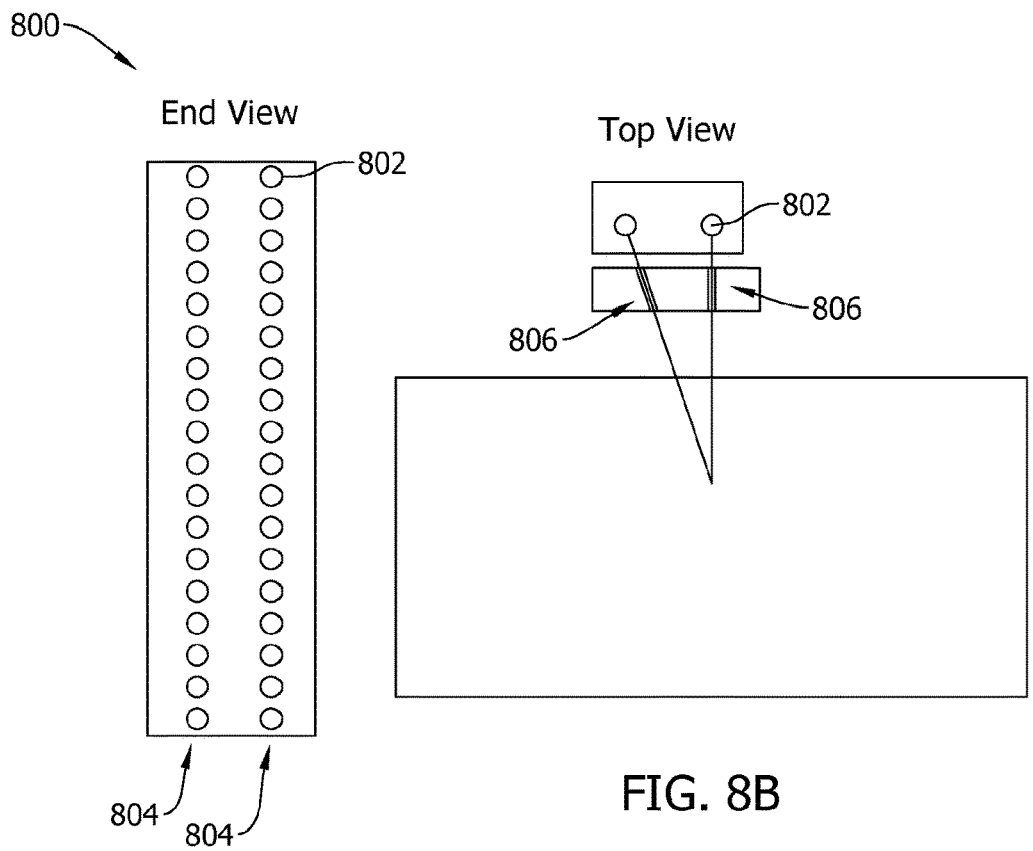
FIG. 8A
FIG. 8B
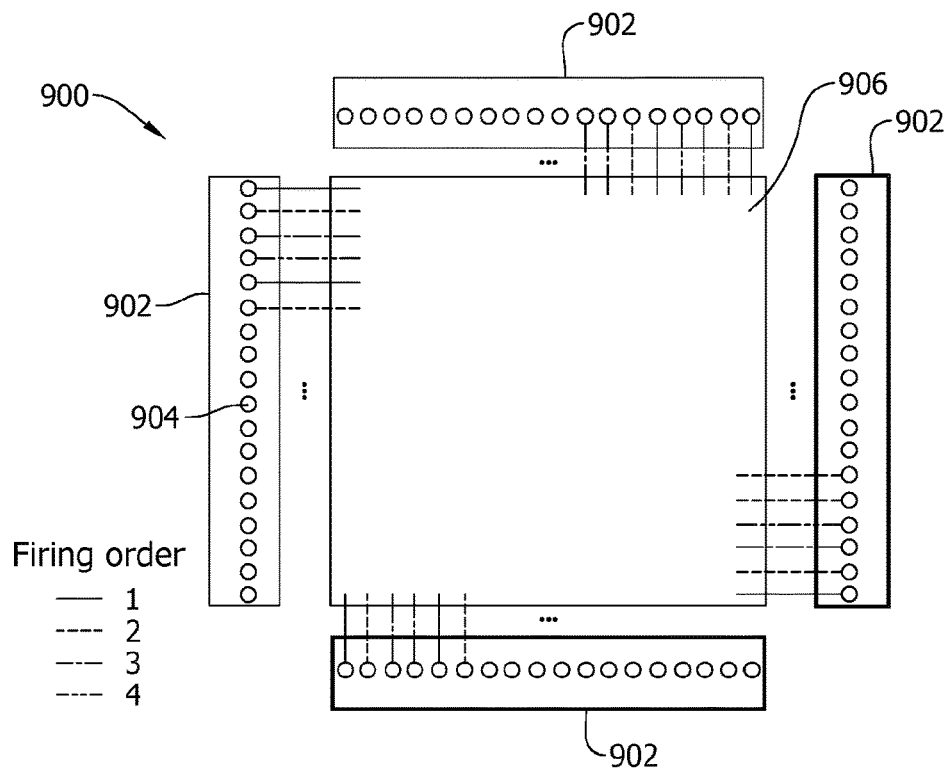
FIG. 9

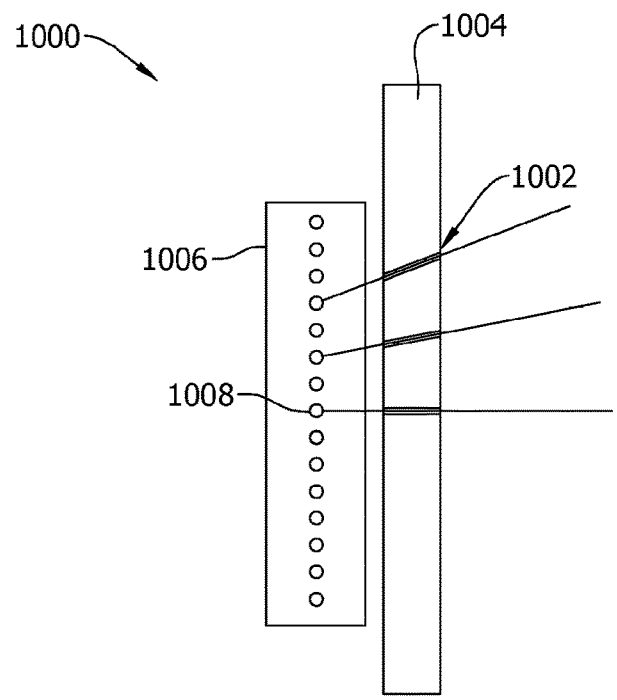
FIG. 10
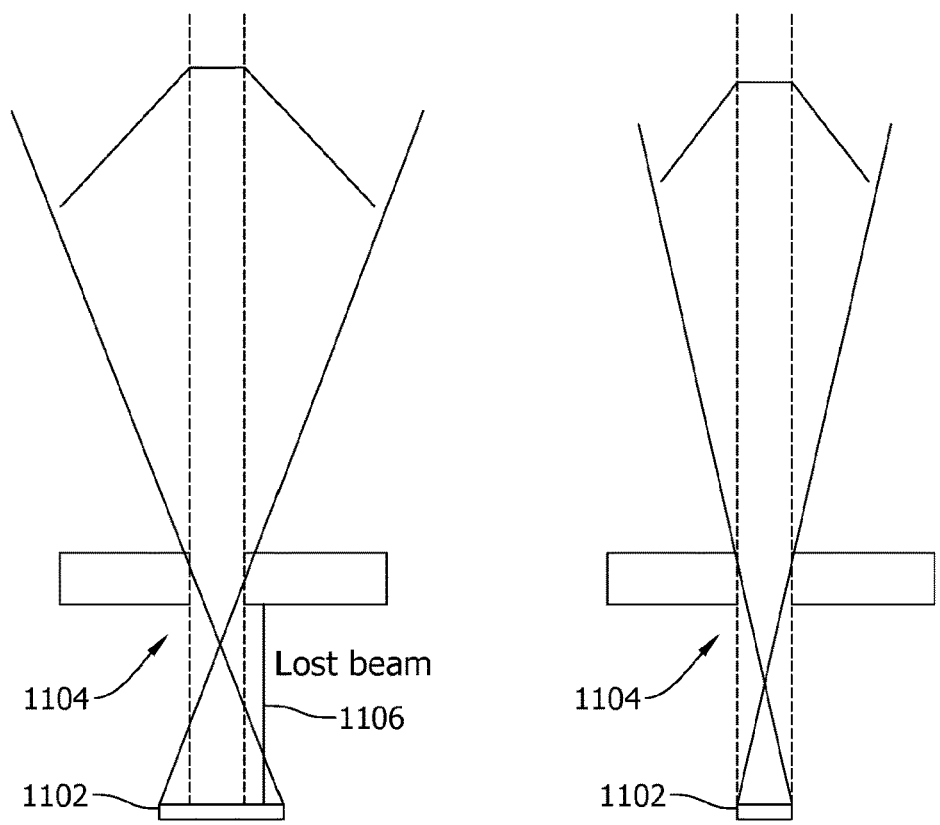
FIG. 11A
FIG. 11B

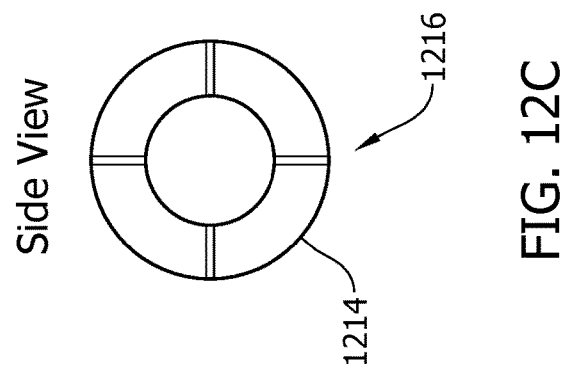
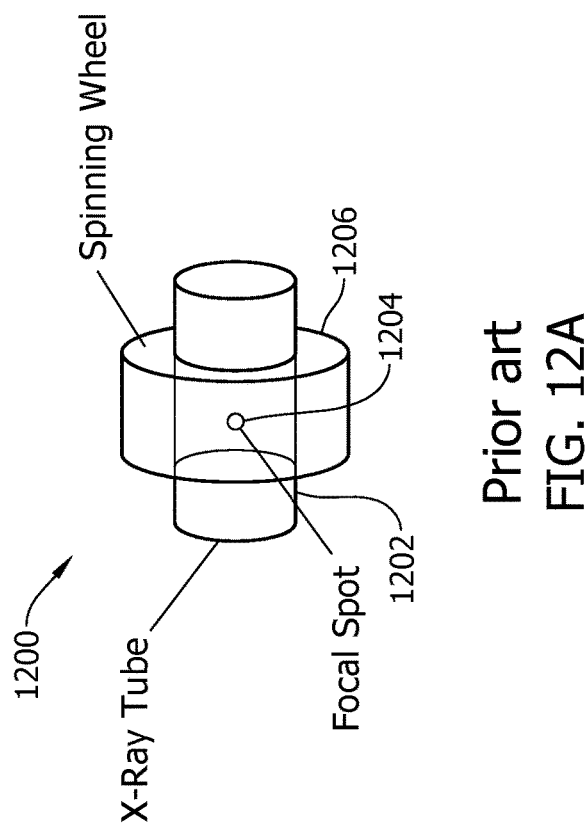
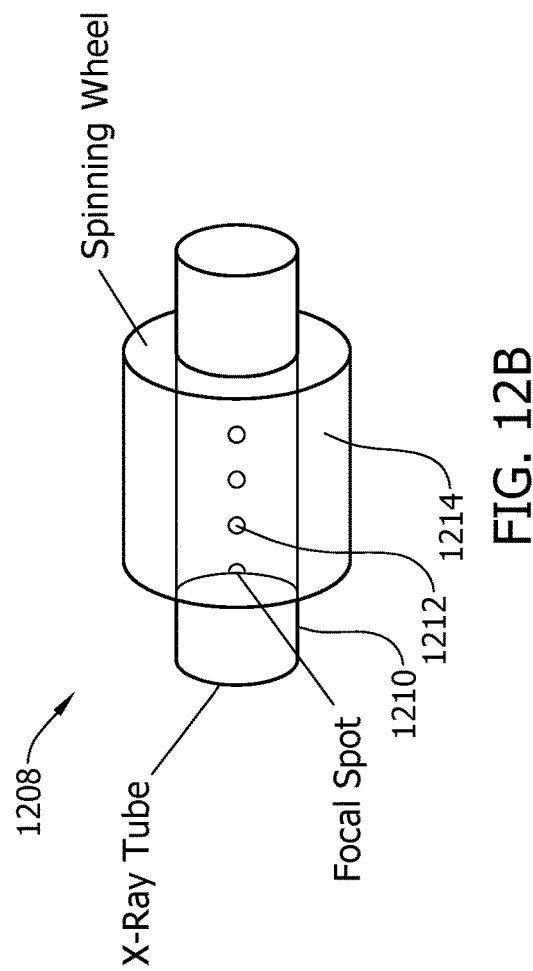
Prior art
FIG. 12A
FIG. 12B
FIG. 12C

SYSTEMS AND METHODS FOR REAL-TIME CONFIGURABLE BACKSCATTER SCANNERS

CROSS-REFERENCE TO RELATED APPLICATIONS

This application is a national stage application of PCT/US2021/038911, filed on Jun. 24, 2021, which claims priority to U.S. Provisional Patent Application Ser. No. 63/043,941, filed Jun. 25, 2020, entitled "SYSTEMS AND METHODS FOR REAL-TIME CONFIGURABLE BACKSCATTER SCANNERS," both of which are incorporated herein by reference in their entirety.

BACKGROUND

The embodiments described herein relate generally to inspection portals, and more particularly, to vehicle inspection portals using x-ray imaging technology.

There is a need to inspect vehicles for explosives, weapons, drugs, and general contraband at borders and the entrance of sensitive facilities. X-rays are typically used because they penetrate the vehicles and allow seeing contraband concealed within the car in a non-intrusive way.

One concept for inspecting vehicles is to stop the vehicle, let the driver and passengers get off, and scan the vehicle with a gantry where the source and detectors move to scan the vehicle. Or, a car-wash type of method can be used where the source and detectors are stationary and the vehicle is translated. These methods result in low throughput non-compatible with well-transited border crossings.

A higher throughput is obtained by driving the vehicle through a portal with an x-ray dose to passengers that does not exceed the maximum allowed by radiation regulations. One method is to use backscatter technology, which produces photo-like images. Since the penetration is low compared with transmission radiography, scans for multiple views are required to allow for a more complete vehicle inspection. There is a need for more advanced methods for portal scanning.

Strict regulations limit the dose to which people in the vehicles may be exposed. Traditional backscatter systems result in low dose to passengers. However, with the use of four-sided systems and high power sources, the dose may exceed regulatory limits. Moreover, the scanning speed depends on the driver of the vehicle, and can vary widely, which could result in higher doses. The radiation source could be configured to allow for a maximum radiation dose for a given nominal inspection driving speed of the vehicle through the portal. However, drivers may not drive at the nominal inspection driving speed. Driving at lower speeds may result in a dose that exceeds the maximum dose. Driving at higher speeds may result in lower image quality, as lower doses could result in dark areas in a corresponding inspection image where the presence of contraband may not be determined.

When the scanning system cannot keep up with the vehicle speed, the scan either is aborted or is collected with gaps in the image.

Accordingly, there is a need to increase the highest vehicle speed that such systems can scan at with acceptable image quality. Further, vehicles to be scanned vary in dimensions. However, typically the complete span of the vehicle is scanned, resulting in sub-optimal image quality and excess dose to environment.

BRIEF DESCRIPTION

In one aspect, a backscatter imaging system for imaging an object is provided. The backscatter imaging system includes a source array including a plurality of discrete sources. The source array is configured to selectively activate the plurality of discrete sources at a frequency that is determined based at least in part on a speed of the object relative to the backscatter imaging system. The backscatter imaging system further includes a collimator array including a plurality of collimators corresponding to the plurality of discrete sources.

In another aspect, a method for imaging an object is provided. The method is performed by a backscatter imaging system including a source array including a plurality of discrete sources. The backscatter imaging system further includes a collimator array including a plurality of collimators corresponding to the plurality of discrete sources. The method includes determining a frequency based at least in part on a speed of the object relative to the backscatter imaging system. The method further includes selectively activating the plurality of discrete sources at the determined frequency.

In another aspect, a source array for a backscatter imaging system for imaging an object is provided. The source array includes a plurality of discrete sources. The source array is configured to selectively activate the plurality of discrete sources at a frequency that is determined based at least in part on a speed of the object relative to the backscatter imaging system. A collimator array includes a plurality of collimators corresponding to the plurality of discrete sources.

BRIEF DESCRIPTION OF THE DRAWINGS

FIG. 1 illustrates a backscatter imaging system in accordance with the present disclosure.

FIG. 2A illustrates a front view of an alternative backscatter imaging system in accordance with the present disclosure.

FIG. 2B illustrates a side view of the backscatter imaging system shown in FIG. 2A FIG. 3A illustrates operation of a known imaging system at a nominal speed.

FIG. 3B illustrates operation of the known imaging system of FIG. 3A at a low speed.

FIG. 3C illustrates operation of the known imaging system of FIGS. 3A and 3B at a high speed.

FIG. 4A illustrates operation of an imaging system in accordance with the present disclosure at a nominal speed.

FIG. 4B illustrates operation of the known imaging system of FIG. 4A at a low speed.

FIG. 4C illustrates operation of the known imaging system of FIGS. 4A and 4B at a high speed.

FIG. 8A illustrates an end view of a configuration for determining depth information for backscatter images in accordance with the present disclosure.

FIG. 8B illustrates a top view of the configuration for determining depth information for backscatter shown in FIG. 8A.

FIG. 9 illustrates a backscatter imaging system including four arrays in accordance with the present disclosure.

FIG. 10 illustrates another backscatter imaging system in accordance with the present disclosure.

FIG. 11A illustrates the effect of a large focal spot size in a backscatter imaging system.

FIG. 11B illustrates the effect of a small focal spot size in the backscatter imaging system shown in FIG. 11A.

FIG. 12A illustrates a known backscatter imaging system.

FIG. 12B illustrates a backscatter imaging system in accordance with the present disclosure.

FIG. 12C illustrates a side view of backscatter imaging system shown in FIG. 12B.

DETAILED DESCRIPTION

Figure 5:
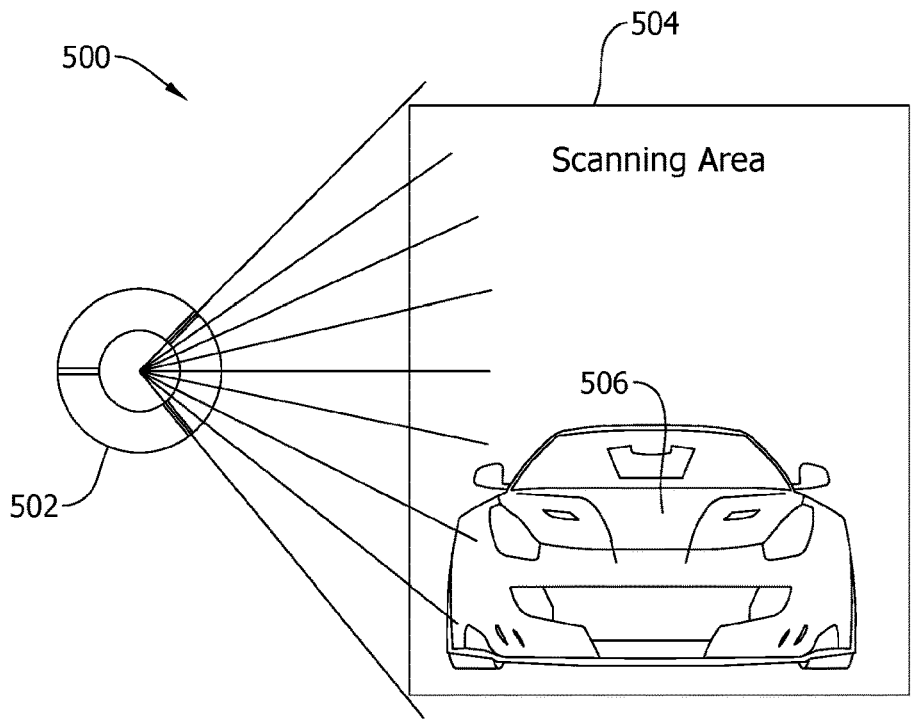
FIG. 5 illustrates operation of a known imaging system.

The present disclosure is directed to backscatter systems for imaging vehicles that improve image quality, reduce x-ray dosage, and prevent scanning areas that do not include the vehicle.

For such systems, it is desirable to have a compact backscatter portal (e.g., due to limited space at installation sites). However, x-rays from multiple views may interfere with one another, resulting in poor image quality.

The systems and methods described provide a compact backscatter portal with discrete sources that are turned on one per side in sequence. This approach provides a viable solution for improved image quality while maintaining a compact system.

The embodiments described herein use a multi-focus source, and adjust firing frequency based on vehicle speed to maintain a radiation dose and image quality at acceptable levels. In some embodiments, only the vehicle itself is scanned, not areas that do not include the vehicle, improving image quality and reducing radiation dose. Further, the embodiments described herein facilitate adjusting source-point currents based on areas that require higher penetration, adjusting image resolution, obtaining depth information, providing a shorter source, and providing a small focal spot and high power source.

FIG. 1 illustrates a backscatter imaging system 100 including an array of discrete sources 102, a collimator array 104, and an object 106 to be imaged (e.g., a vehicle). The length of the array spans the size of the object 106. Each source 102 in the array is associated with a collimator in the collimator array 104 that shapes the beam to cover the object 106. Each source 102 is turned on based on a specific firing sequence, which allows for scanning patterns not possible with spinning wheels known in the art. Discrete sources 102 are disposed on a tube 108, which is partially surrounded by a shielding 110.

As shown in FIGS. 2A and 2B, in some embodiments, an electron-beam steered source may be used instead. In such embodiments, an electron beam 202 is steered onto discrete points on a target 204 to produce x-rays. The position of the electron beam 202 is adjusted by controlling electromagnetic components. Instead of multiple discrete electron sources (as in the embodiment of FIG. 1), there is one electron source, but the beam production is generally the same.

At least some known systems include spinning wheels that control the frequency of x-ray beams emitted. Such wheels typically rotate at one frequency, the frequency selected to cover the complete vehicle at the maximum speed. The frequency may be adjustable, but is generally not adjustable in real time. Operation of such systems will now be briefly described in reference to FIGS. 3A-3C.

At the nominal speed, the vehicle is scanned with pixels 302 forming no gaps and no overlaps, as shown in FIG. 3A. At low speed, the system oversamples the vehicle, which results in better image quality and increased dose to passengers and environment, as shown in FIG. 3B. Higher resolution may be better for some applications. However, a consistent resolution for different vehicles may be desirable to ensure homogeneous image quality for better contraband detection. When a vehicle speed exceeds a maximum frequency of the spinning wheel, either the scan is aborted or the data has gaps, as shown in FIG. 3C. These gaps are contiguous and may result in poor spatial resolution and misdetection.

In contrast, with reference to FIGS. 4A-4C, the embodiments described herein dynamically adjust the scanning frequency based on the speed of the vehicle. Specifically, the scanning frequency is determined as $f=(V/V_o)*f_o$, where f is the new frequency, $f_o$ is the nominal frequency, V is the instantaneous vehicle speed and $V_o$ is the nominal vehicle speed. This facilitates achieving the same image quality and same dose to passengers up to the maximum vehicle speed, as shown in FIGS. 4A and 4B.

In accordance with the present disclosure, the pattern when the speed exceeds the maximum speed is shown in FIG. 4C. Although the missing area is approximately the same as in FIG. 3, there are no contiguous missing areas. This allows for averaging neighboring pixels 402 to generate an averaged pixel 404, resulting in better spatial resolution (which may be referred to as "checkerboard scanning"). In another embodiment, where an important goal is to maintain the dose, the frequency is kept fixed and the beam current (I) is adjusted based on speed: $I=(V/V_o)*I_o$ where $I_o$, is the nominal beam current.

The embodiments described herein also facilitate scanning only areas including the vehicle, and excluding areas that do not include the vehicle. For example, FIG. 5 shows a known system 500 having a spinning wheel scanner 502 in which the backscatter scan covers the complete scanning area 504. Accordingly, when the object 506 is smaller than this area, air is scanned (e.g., above the vehicle). This results in a suboptimal scan.

Figure 6:
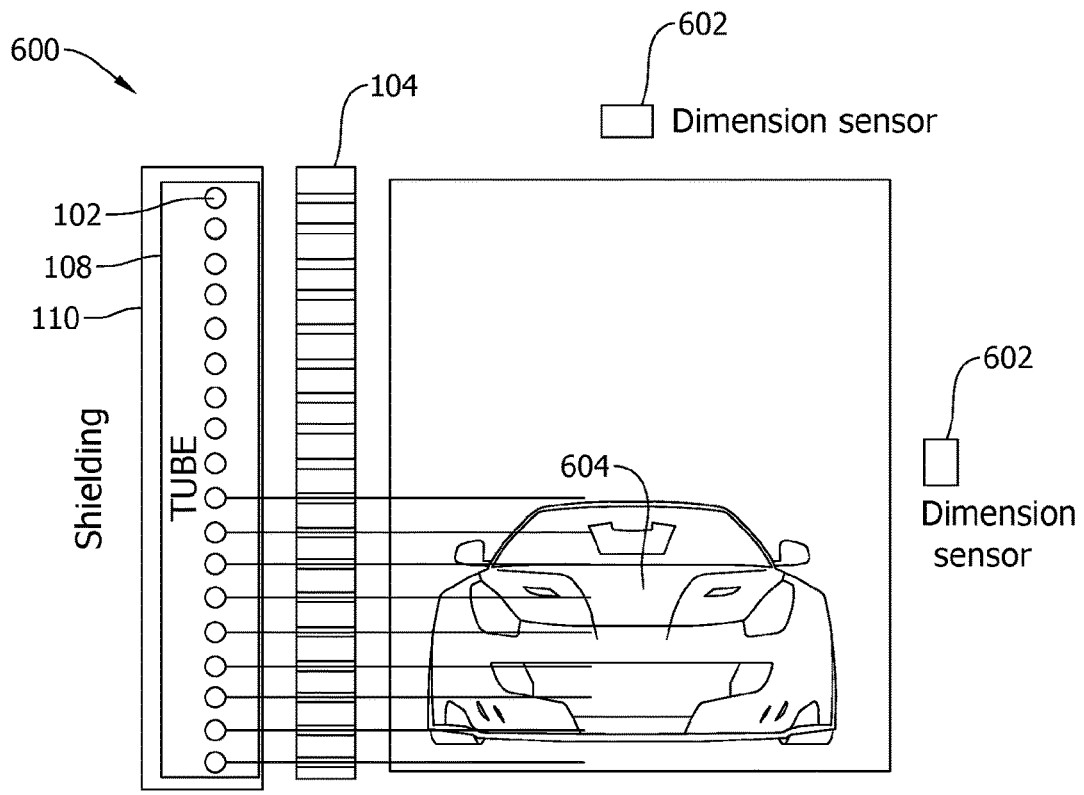
FIG. 6 illustrates operation of an imaging system in accordance with the present disclosure.

In contrast, in the embodiments described herein, as shown in the system 600 of FIG. 6, which may be similar to system 100 of FIG. 1, there are sensors 602 that detect the dimensions of the vehicle 604 and only scan within the span of the vehicle. This allows increasing the scanning frequency to allow for better image quality or to extend the max vehicle speed the system 600 is capable of scanning at. Further, if the system 600 is limited by a maximum dose, because fewer beams are being used, the beam intensity could be increased without exceeding the max dose, improving image quality.

Figure 7A:
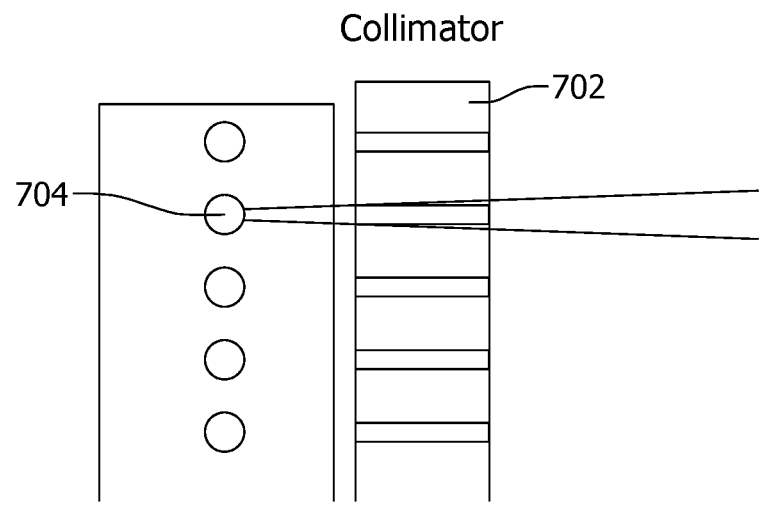
FIG. 7A illustrates an imaging system in accordance with the present disclosure adjusted to a low resolution.
Figure 7B:
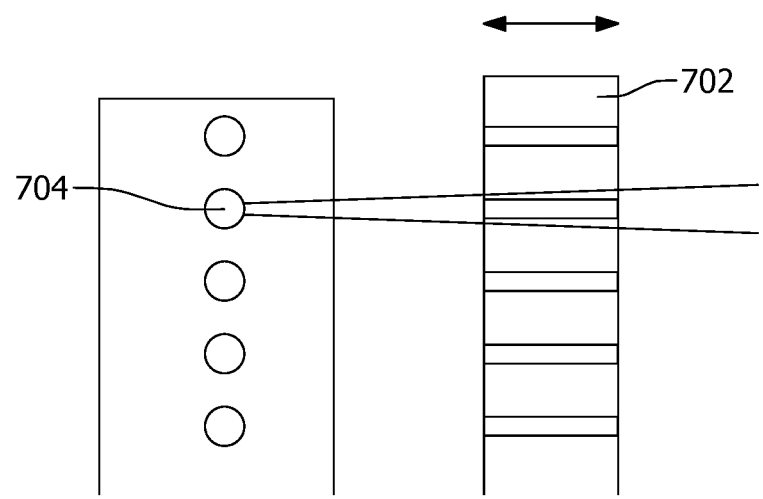
FIG. 7B illustrates the imaging system shown in FIG. 7A adjusted to a high resolution.

The embodiments described herein also enable adjusting a resolution of the system in real time, as shown in FIGS. 7A and 7B. For example, there may be situations where the system resolution is required to change quickly, which cannot be done with spinning wheels. However, as shown in FIGS. 7A and 7B, the resolution in these embodiments may be adjusted by moving the collimator array 702 closer to (as shown in FIG. 7A) or further from (as shown in FIG. 7B) the source 704. The resolution may be changed in seconds, based on, for example, the type of object, the position of the object, etc. As another example, when the object speed is faster than the system can handle, the beam size can be increased. The image resolution will decrease, but no parts of the object will be missed during imaging.

The embodiments described herein also enable determining depth information for backscatter images, as shown in the system 800 of FIGS. 8A and 8B. One method includes using collimators focused to every depth. However, this reduces the signal and results in high noise. Another method is to use nano-second pulsed x-rays. However, this is not present possible using compact sources. Accordingly, as shown in FIGS. 8A and 8B, one or more rows of discrete sources 802 may be used to obtain depth information. One example sequence is to fire one column 804 followed by the next column 804. As shown in FIG. 8, when two columns 804 are used, a collimator aperture 806 associated with one column 804 is angled relative to a collimator aperture 806 associated with the other column 804 to provide depth information. Alternatively, another example sequence is to fire in rows.

In some embodiments, it may be beneficial to operate the sources at a lower intensity than the maximum intensity. For example, to increase source lifetime, in some embodiments, the system is capable of a high peak current but is limited to a lower average, to reduce dose to environment, to reduce dose to passenger, etc. In one embodiment, the type of vehicle is identified and a vehicle-specific intensity pattern is used to optimize the penetration where needed and reduce dose where not needed. For example, doors are generally more attenuating than glass, so the beam intensity may be increased when door panels are scanned. In some embodiments, the source intensity may be adjusted based on the image noise of the previously scanned pixels in same row. If the noise was high in the previously scanned pixels, the intensity is increased for subsequent pixels, and vice versa.

FIG. 9 is a backscatter imaging system 900 including four arrays 902, each array including a plurality of discrete sources 904. The arrays are positioned on different sides of the object 906. In one embodiment, one source 904 is activated at a time, and the activated sources 904 switch between arrays 902 each time. For example, one firing sequence includes activating a first source on a first array, then activating a first source on a second array, then activating a first source on a third array, then activating a first source on a fourth array, then activating a second source on the first array, then activating a second source on the second array, and so on. Those of skill in the art will appreciate that other firing sequences are possible. Further, the firings within each array may span the size of the corresponding size of the object 906.

FIG. 10 is another embodiment of a backscatter imaging system 1000. In this embodiment, the collimator apertures 1002 in the collimator array 1004 are oriented at different angles relative to one another. This enables imaging an object with a length longer than that of the array 1006 of sources 1008 by producing oblique views, instead of only parallel views. For such embodiments, the size of the array 1006 of sources 1008 may be decreased, with the sources 1008 located closer to each other.

In at least some known systems, a single spot x-ray tube is used with a spinning wheel to produce a scanning pencil beam. For a given energy, the image noise is limited by the x-ray power of the x-ray tube, and the x-ray tube power depends on the size of the focal spot-larger focal spot sizes allow for higher power (and smaller focal spots may result in damage to a target if the source is active for too long). However, the image resolution is partially dependent on the focal spot size, and a smaller focal spot size results in higher resolution. There is a need for a high power x-ray source with small focal spot to reduce the image noise and improve spatial resolution.

FIGS. 11A and 11B illustrates the effect of a size of focal spot 1102. When the focal spot size is large and a high spatial resolution is desired, a small collimator opening 1104 is used. This results in long tails and lost beam 1106, as shown in FIG. 11A. The long tails reduce resolution, and the lost beam reduces the signal and increases image noise. A small focal spot 1102, as shown in FIG. 11B, results in small tails and no lost beam.

In at least some known systems, a single spot x-ray tube is always active during the scan, preventing the use of smaller focal spots (as smaller focal spots at high power may damage the target with a single spot source). However, in the embodiments described herein, because multiple sources in an array are used, the beams can operate for a fraction of the time, enabling smaller focal spots.

Specifically, the power density of a single-spot source is reduced when switching to using two or more focal spots with corresponding sources in close proximity. Each source is only activated for a portion of the time, reducing its thermal load. This allows for reducing focal spot size and/or increasing power.

FIGS. 12A-12C compare a known spinning wheel implementation 1200 with an x-ray tube 1202 having a single-spot source 1204 and spinning wheel 1206, (shown in FIG. 12A) to a system 1208 of the present disclosure including an x-ray tube 1210 array of multiple sources 1212 and a spinning wheel 1214 with associated collimator apertures 1216 (shown in FIGS. 12B and 12C).

By using multiple sources 1212, each one with a small focal spot and higher combined power, the system 1208 can produce higher resolution images and higher penetration. Various embodiments are envisioned for adjusting the rotational speed of the spinning wheel 1214, the firing frequency of the sources 1212, and the object (e.g., vehicle) speed. In one embodiment, the frequencies of the spinning wheel rotation and the source firing can be synchronized to start at the same location. That is, the sources 1212 are configured to switch between firings at the same frequency that the collimator apertures 1216 in the spinning wheel 1214 align with the sources 1212. Further, the frequencies and source spacing for a given vehicle speed may be configured to produce a complete overlap of the beams on the object (which is generally equivalent to a single spot operating at a higher power) or partially overlap (for higher resolution). Image processing is used to process the image into a single two-dimensional image. Further, the distance between source points is relatively small to produce similar signals at the detectors.

Figure 13:
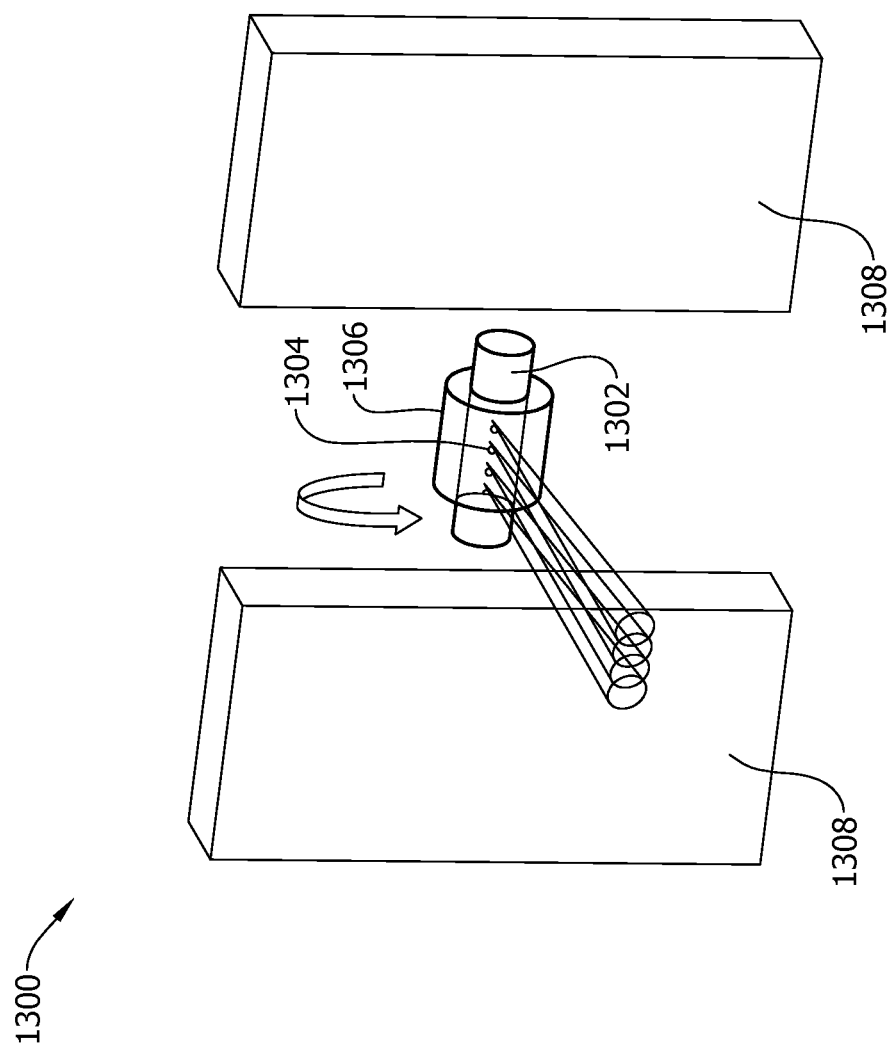
FIG. 13 illustrates another backscatter imaging system in accordance with the present disclosure.

FIG. 13 shows a system 1300 including an array 1302 with multiple sources 1304 and a spinning wheel 1306, as well as detectors 1308 on either side of the array 1302 and spinning wheel 1306. Since one source 1304 is on at a time, only one pencil beam is projected at a time. In this embodiment, the object (e.g., a vehicle) generally moves from in a direction generally parallel to an axis of rotation of the spinning wheel 1306. That is, in this embodiment, the spinning wheel 1306 does not rotate in the direction of travel of the object.

Exemplary embodiments of methods and systems for backscatter imaging are described above in detail. The methods and systems are not limited to the specific embodiments described herein, but rather, components of systems and/or steps of the methods may be used independently and separately from other components and/or steps described herein. Accordingly, the exemplary embodiments can be implemented and used in connection with many other applications not specifically described herein.

In one embodiment, a backscatter imaging system for imaging an object is provided. The backscatter imaging system includes a source array including a plurality of discrete sources, and a collimator array including a plurality of collimators corresponding to the plurality of discrete sources. The source array is configured to selectively activate the plurality of discrete sources at a frequency that is determined based at least in part on a speed of the object relative to the backscatter imaging system.

In one aspect, the backscatter imaging system includes at least one dimension sensor configured to determine a dimension of the object, and the source array is configured to selectively activate the plurality of discrete sources based on the determined dimension. In another aspect, the collimator array is movable relative to the source array to adjust a resolution of the backscatter imaging system. In another aspect, at least some of the collimators are oriented at different angles. In another aspect, the backscatter imaging system includes one or more additional source arrays to provide multiple views of the object. In another aspect, the source array includes multiple rows or columns of discrete sources to facilitate determining depth information. In another aspect, the backscatter imaging system is implemented using a small focal spot at high power.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A backscatter imaging system for imaging an object, said backscatter imaging system comprising:
   at least one dimension sensor configured to determine a dimension of the object;
   a source array comprising a plurality of discrete sources, said source array configured to selectively activate, based on the determined dimension, said plurality of discrete sources at a frequency that is determined based at least in part on a speed of the object relative to said backscatter imaging system; and
   a collimator array comprising a plurality of collimators corresponding to said plurality of discrete sources.

2. The backscatter imaging system of claim 1, wherein said collimator array is movable relative to said source array to adjust a resolution of the backscatter imaging system.

3. The backscatter imaging system of claim 1, wherein at least some of said plurality of collimators are oriented at different angles.

4. The backscatter imaging system of claim 1, further comprising one or more additional source arrays to facilitate providing multiple views of the object.

5. The backscatter imaging system of claim 1, wherein said source array comprises multiple rows or columns of discrete sources to facilitate determining depth information.

6. The backscatter imaging system of claim 1, wherein said backscatter imaging system is implemented using a relatively small focal spot at a relatively high power.

7. A method for imaging an object, said method performed by a backscatter imaging system including at least one dimension sensor and a source array including a plurality of discrete sources, the backscatter imaging system further including a collimator array including a plurality of collimators corresponding to the plurality of discrete sources, said method comprising:
   determining, by the dimension sensor, a dimension of the object;
   determining a frequency based at least in part on a speed of the object relative to the backscatter imaging system; and
   selectively activating, based on the determined dimension, the plurality of discrete sources at the determined frequency.

8. The method of claim 7, further comprising adjusting a resolution of the backscatter imaging system by moving the collimator array relative to the source array.

9. The method of claim 7, wherein at least some of the plurality of collimators are oriented at different angles.

10. The method of claim 7, further comprising providing multiple views of the object using one or more additional source arrays of the backscatter imaging system.

11. The method of claim 7, wherein the source array includes multiple rows or columns of discrete sources, and wherein said method further comprises determining depth information using the multiple rows or columns of discrete sources.

12. The method of claim 7, wherein the backscatter imaging system is implemented using a relatively small focal spot at a relatively high power.

13. A source array for a backscatter imaging system for imaging an object, said source array comprising a plurality of discrete sources, said source array configured to selectively activate, based on a dimension of the object determined by a dimension sensor, said plurality of discrete sources at a frequency that is determined based at least in part on a speed of the object relative to the backscatter imaging system.

14. The source array of claim 13, wherein said source array is moveable relative to a collimator array to adjust a resolution of the backscatter imaging system, the collimator array including a plurality of collimators corresponding to said plurality of discrete sources.

15. The source array of claim 14, wherein at least some of the plurality of collimators in the collimator array are oriented at different angles.

16. The source array of claim 13, further configured to, with one or more additional source arrays, provide multiple views of the object.

17. The source array of claim 13, further comprising multiple rows or columns of discrete sources to facilitate determining depth information.

* * * * *